(12) United States Patent
Chung et al.

(10) Patent No.: US 11,412,199 B2
(45) Date of Patent: *Aug. 9, 2022

(54) METHOD AND DEVICE FOR IMPLEMENTING FRAME SYNCHRONIZATION BY CONTROLLING TRANSIT TIME

(71) Applicant: ALPHACIRCLE CO., LTD., Seongnam-si (KR)

(72) Inventors: Ta Sik Chung, Seongnam-si (KR); Dong Woo Cha, Seongnam-si (KR)

(73) Assignee: ALPHACIRCLE CO., LTD., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/388,042

(22) Filed: Jul. 29, 2021

(65) Prior Publication Data

US 2021/0360220 A1 Nov. 18, 2021

Related U.S. Application Data

(63) Continuation of application No. PCT/KR2020/001517, filed on Jan. 31, 2020.

(30) Foreign Application Priority Data

Jan. 31, 2019 (KR) .................. 10-2019-0012531

(51) Int. Cl.
*H04N 9/47* (2006.01)
*H04N 13/167* (2018.01)
(Continued)

(52) U.S. Cl.
CPC ......... *H04N 13/167* (2018.05); *H04N 13/117* (2018.05); *H04N 13/332* (2018.05); *H04N 13/383* (2018.05)

(58) Field of Classification Search
CPC .. H04N 13/167; H04N 13/117; H04N 13/332; H04N 13/383
(Continued)

(56) References Cited

U.S. PATENT DOCUMENTS 9,723,223 B1 8/2017 Banta et al.
10,168,981 B2 1/2019 Song et al.
(Continued)

FOREIGN PATENT DOCUMENTS

KR 10-2017-0047489 A 5/2017
KR 10-2017-0094745 A 8/2017
(Continued)

OTHER PUBLICATIONS

China National Intellectual Property Administration, Office Action for Chinese Patent Application No. 2020800113272.2, dated Dec. 3, 2021, 6 pages.

*Primary Examiner* — Gims S Philippe
(74) *Attorney, Agent, or Firm* — Nicholas Park

(57) ABSTRACT

Present Invention provides a method of virtual reality image transition configured to implement frame synchronization by controlling transit time among image segmentation expressing virtual reality comprises, (a) determining a key frame distance (KFD) of image segmentation expressing a part of original image for implementing virtual reality, (b) implementing frame synchronization between image segmentation before and after transition by executing a transition of image segmentation only in a key frame among frames composing image segmentation, when reproduced image segmentation is transited as the user's gaze changes.

3 Claims, 6 Drawing Sheets

(51) Int. Cl.
*H04N 13/332* (2018.01)
*H04N 13/383* (2018.01)
*H04N 13/117* (2018.01)

(58) Field of Classification Search
USPC .......................................................... 348/53
See application file for complete search history.

(56) References Cited

U.S. PATENT DOCUMENTS

| | | | |
|---|---|---|---|
| 2004/0041822 A1* | 3/2004 | Iizuka | G06T 15/10 345/634 |
| 2010/0054578 A1* | 3/2010 | Ekpar | G06T 19/003 382/154 |
| 2015/0123966 A1* | 5/2015 | Newman | G06T 19/006 345/419 |
| 2016/0086372 A1* | 3/2016 | Trull | G02B 27/0101 345/633 |
| 2016/0307371 A1* | 10/2016 | Ayers | G11B 27/19 |
| 2016/0314624 A1* | 10/2016 | Li | G06F 3/0482 |
| 2017/0262045 A1* | 9/2017 | Rouvinez | G06F 3/011 |
| 2017/0309234 A1* | 10/2017 | Richards | G02B 6/0076 |
| 2018/0255290 A1* | 9/2018 | Holzer | H04N 13/279 |
| 2021/0211631 A1 | 7/2021 | Shin et al. | |

FOREIGN PATENT DOCUMENTS

| | | |
|---|---|---|
| KR | 10-2017-0123656 A | 11/2017 |
| KR | 20180028870 A | 3/2018 |
| KR | 20180038256 A | 4/2018 |
| KR | 10-2018-0052255 A | 5/2018 |
| KR | 10-2018-0137816 A | 12/2018 |

\* cited by examiner $T_{f,m}$ Key frame time
$\Delta t_{seek,1}$ , seek time for key frame of case 1
$t_{ss,1}$ , switching start for key frame of case 1
$\Delta t_{wait}$ , $V_i$ run time before switch
$\Delta t_{f,ready}$ , $V_j$ subsequent frame ready time
$\Delta t_{transit}$ , $V_i \rightarrow V_j$ frame transit time

METHOD AND DEVICE FOR IMPLEMENTING FRAME SYNCHRONIZATION BY CONTROLLING TRANSIT TIME

CROSS-REFERENCE TO RELATED APPLICATION

This application is a US Bypass Continuation Application of International Application No. PCT/KR2020/001517, filed on Jan. 31, 2020 and designating the United States, the International Application claiming a priority date of Jan. 31, 2019 based on prior Korean Patent Application No. 10-2019-0012531, filed on Jan. 31, 2019. The disclosure of which is incorporated herein by reference in its entirety.

BACKGROUND

1. Field of the Invention—Technical Field

The present invention relates to a transit method of virtual reality image segmentation and a virtual reality image reproducing device.

2. Discussion of Related Art

When the original image that implements virtual reality is an image covers 360°, it is unnecessary to reproduce the part of the image that the user's gaze does not reach.

Therefore, after dividing into a plurality of image segmentation by dividing the original image into a predetermined segment, reproducing only the image segmentation corresponding to the part of the user's gaze helps to use the hardware efficiently.

However, if the image segmentation is reproduced in this manner, the image segmentation that is reproduced should be transited as the user's gaze moves. However, the screen freeze problem occurs if the transit time is delayed too much.

In addition, the problem that the previously reproduced image is replayed or a scene to be reproduced is skipped occurs, if the frames of image segmentation before transition and image segmentation after transition are not synchronized.

Accordingly, the inventor of the present invention has completed the present invention after a long period of research and trial and error in order to solve such a problem.

SUMMARY OF THE INVENTION

The present invention, in order to solve the above-described problems, provides a virtual reality image segmentation transit method and a virtual reality image reproducing device that controls the transit time of image segmentation reproduced among a plurality of image segmentation to prevent screen freeze.

In addition, the present invention provides the virtual reality image segmentation transit method and the virtual reality image reproducing device that synchronize frames of image segmentation before transition and image segmentation after transition.

The technical problems to be achieved in the present invention are not limited to the above technical problems, and other technical problems not mentioned will be clearly understood by those of ordinary skill in the art to which the present invention belongs from the following description.

One aspect of the present invention for solving the above problems provides a method of virtual reality image transition configured to implement frame synchronization by controlling transit time among image segmentation expressing virtual reality comprising: (a) determining a key frame distance (KFD) of image segmentation expressing a part of original image for implementing virtual reality; and (b) implementing frame synchronization between image segmentation before and after transition by executing a transition of image segmentation only in a key frame among frames composing image segmentation, when reproduced image segmentation is transited as the user's gaze changes;

In a preferred embodiment, the image segmentation of step (a) is configured to shorten the key frame distance by not including Bidirectional frame in the image segmentation.

In a preferred embodiment, the step (a) further comprises, a step of determining a Play FOV of image segmentation by adding a Guard FOV to a Temporary FOV covered by a temporary image segmentation, in the temporary image segmentation that divides the original image into Nth regions, the step (b) starts transition procedure of image segmentation when the user's gaze reaches a specific point among the guard FOV of reproduced image segmentation and prevents the user's gaze located outside of the Play FOV of reproduced image segmentation before the transition of image segmentation is finished.

In a preferred embodiment, the step (a) further comprises a step of determining a Virtual Device FOV wider than a Device FOV of the head-mounted display by a predetermined Additional FOV, the step (b) starts transition procedure of image segmentation when the user's gaze reaches a specific point among the guard FOV of reproduced image segmentation and prevents the user's gaze located outside of the Play FOV of reproduced image segmentation before the transition of image segmentation is finished.

In a preferred embodiment, the step (a) further comprises, a step of determining a Play FOV of image segmentation by adding a Guard FOV to a Temporary FOV covered by a temporary image segmentation, in the temporary image segmentation that divides the original image into Nth regions, and a step of determining a Virtual Device FOV wider than a Device FOV of the head-mounted display by a predetermined Additional FOV, the step (b) comprises starting transition procedure of image segmentation when one end of the Virtual Device FOV reaches a specific point in the Guard FOV included in the Play FOV.

Another aspect of the present invention provides an image reproducer that reproduces a segmented image that expresses a part of the original image for expressing virtual reality, an image segmentation synchronization module that controls the transition time of a segmented image to synchronize the frames of the segmented image before and after transition when reproduced image segmentation is transited as the user's gaze changes, wherein the image segmentation synchronization module implements frame synchronization between image segmentation before and after transition by executing a transition of image segmentation only in a key frame among frames composing image segmentation.

It is revealed that the accompanying drawings are exemplified as a reference for understanding the technical idea of the present invention, and the scope of the present invention is not limited thereby.

DETAILED DESCRIPTION

In the description of the present invention, if it is determined that the subject matter of the present invention is unnecessarily obscured as it is obvious to those skilled in the art with respect to related known functions, the detailed description will be omitted.

Figure 1A:
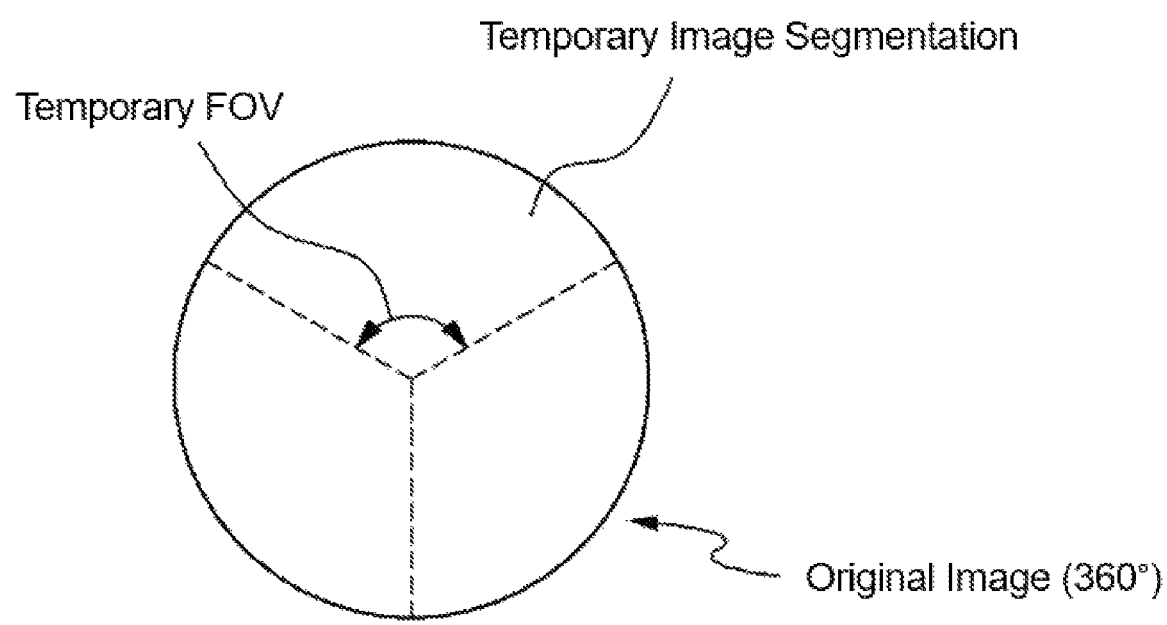
FIG. 1A to 1C is a view for explaining a Play FOV and a Virtual Device FOV of the present invention.
Figure 1B:
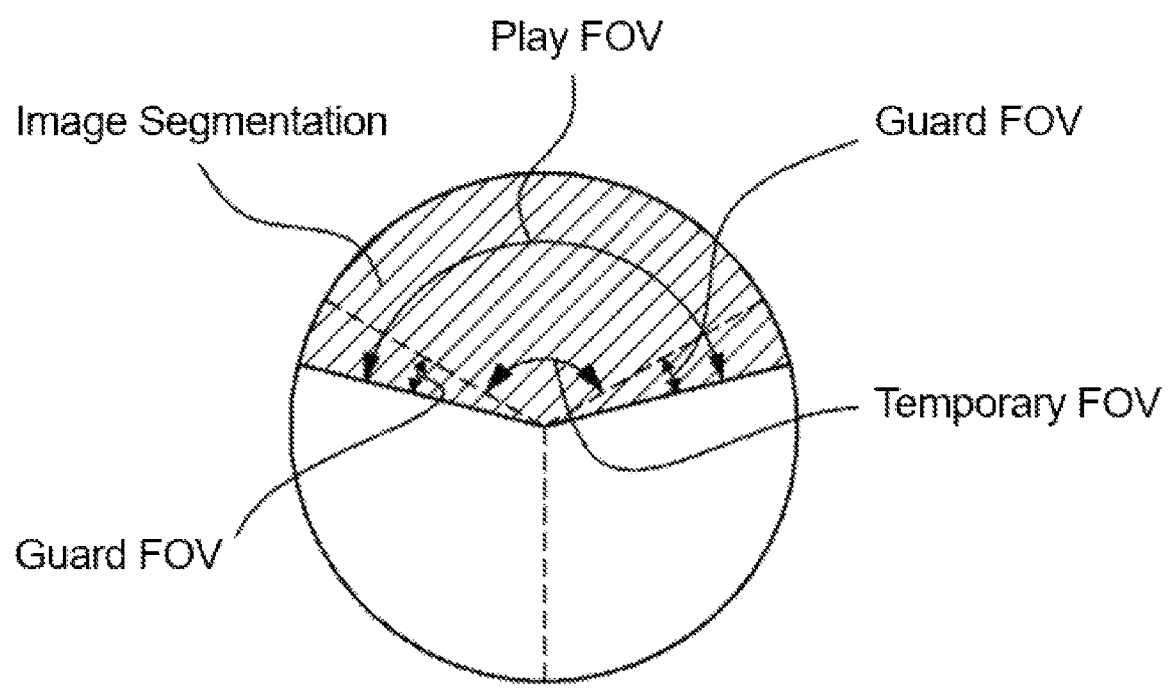
Figure 1C:
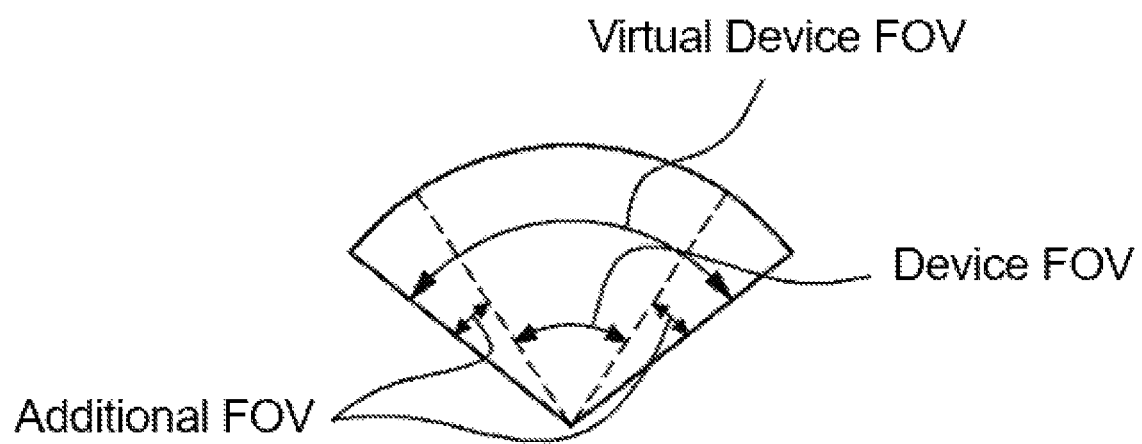

FIG. 1A to 1C is a view for explaining a Play FOV and a Virtual Device FOV of the present invention.

Referring to FIG. 1A, temporary image segmentation is an image when the original image is divided into n regions. Temporary FOV is the field of view covered by temporary image segmentation. Temporary image segmentation has no overlapping regions.

Referring to FIG. 1B, Guard FOV refers to the field of view added to both sides of the Temporary FOV to extend the Temporary FOV. Play FOV is the field of view covered by image segmentation, and is the sum of the Temporary FOV and the Guard FOV. A plurality of image segmentation overlaps each other by an extended Guard FOV.

Referring to FIG. 1C, Device FOV refers to a unique field of view that a device such as a head-mounted display (HMD) can cover as a hardware. Additional FOV is a value added to the device field of view. The Virtual Device FOV is the sum of the Device FOV and Additional FOV, and means a field of view virtually wider than the Device FOV.

Figure 2:
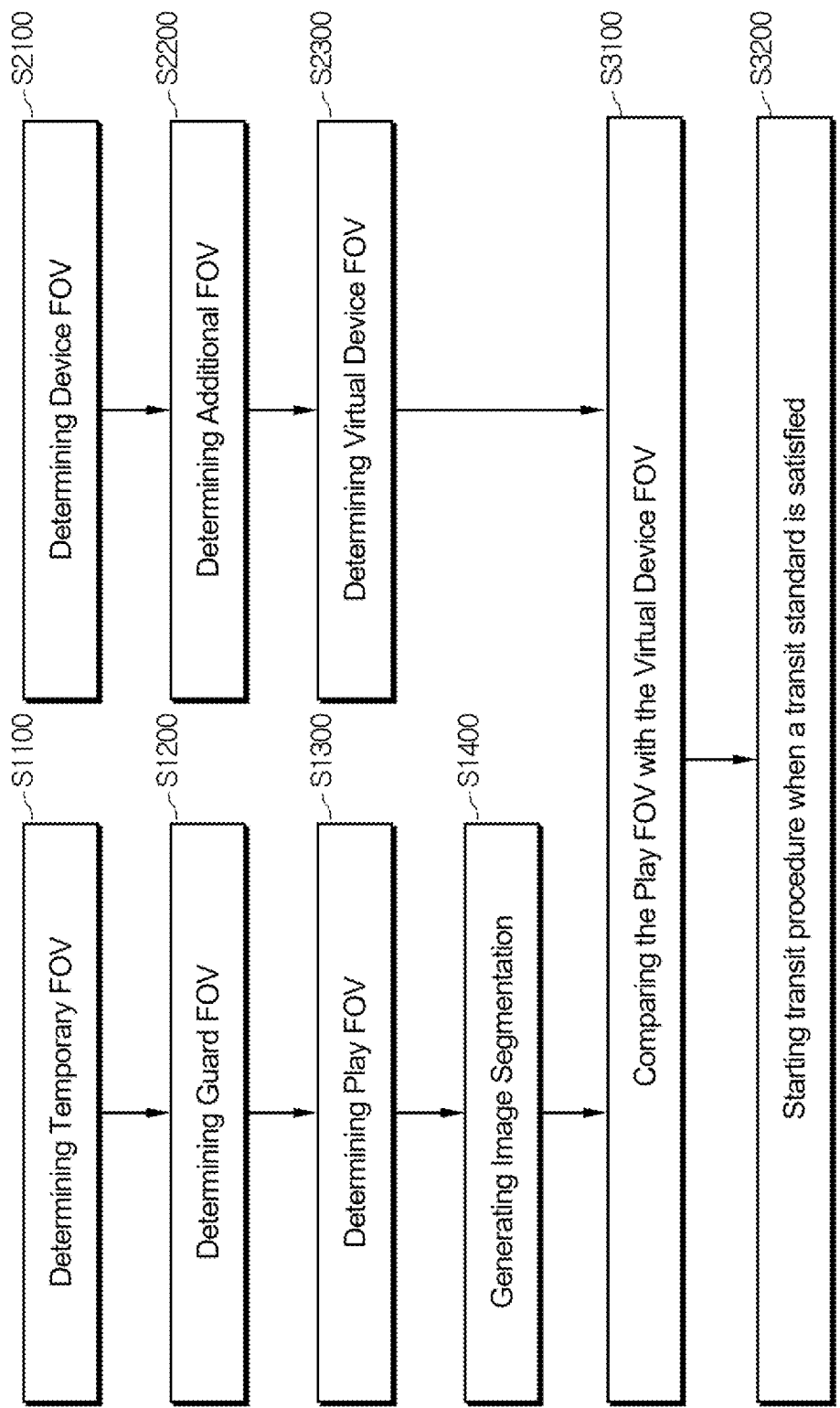
FIG. 2 is a diagram for explaining a preferred embodiment of the Virtual Reality Image segmentation transit method of the present invention.

FIG. 2 is a diagram for explaining a preferred embodiment of the Virtual Reality Image segmentation transit method of the present invention.

The virtual reality image segmentation transit method of the present invention may be implemented in an image segmentation reproducing device. The image segmentation reproducing device is a computing device and may be the same device as the virtual reality image reproducing device or be a different device.

Referring to FIG. 2, in operation S1100, Temporary FOV which is the field of view covered by the temporary image segmentation can be calculated by determining how many (N) temporary image segmentation is divided from the original image. If the original image is 360° and N is 4, the temporary FOV becomes 90°.

In operation S1200, the size of the Guard FOV is decided for extending the temporary FOV. In operation S1300, the Play FOV is determined by adding a Guard FOV to both sides of the Temporary FOV. In operation S1400, an image segmentation is generated to cover regions as much as Play FOV. When image segmentation is generated in above manner, a plurality of image segmentation overlaps each other by the extended Guard FOV. In a preferred embodiment, the Guard FOV is set to ½ or more of the Device FOV of the head-mounted display.

In operation S2100, Device FOV, which is the unique field of view of a device such as a head-mounted display (HMD), is determined. In operation S2200, Additional FOV for extending the Device FOV is determined. In operation S2300, Virtual Device FOV is determined by adding Additional FOV to Device FOV.

In operation S3100, The Virtual Device FOV that varies according to the user's gaze is compared with the Play FOV of the image segmentation being reproduced.

In operation S3200, a transit procedure of image segmentation is started when a predetermined transit standard calculated using the Virtual Device FOV and the Play FOV of the image segmentation being reproduced is satisfied.

A step of implementing frame synchronization, between image segmentation before and after the transition by executing the transition of image segmentation only in the key frame of image segmentation, may be comprised when the transit procedure of image segmentation is started.

In a preferred embodiment, the transit standard may be determined that the reproduced image segmentation among the plurality of image segmentation is transited when one end of the Virtual Device FOV reaches a specific point in the Guard FOV included in the Play FOV. The specific point is determined within the range of the Guard FOV.

In another embodiment, the transit standard may be determined that the reproduced image segmentation using the reference angle θL of the Virtual Device FOV is transited. The reference angle will be described in detail with reference to FIG. 3.

Figure 3:
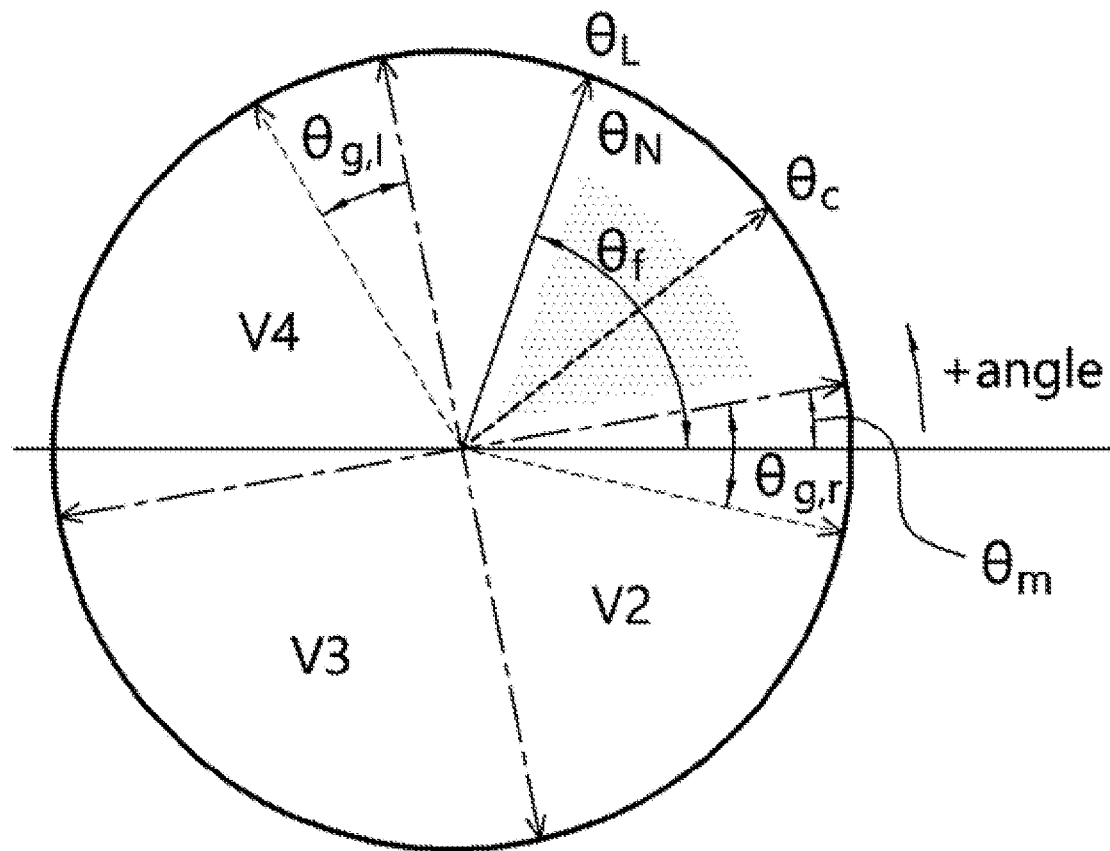
FIG. 3 is a diagram for explaining a method of controlling the transit time of image segmentation in the present invention.

FIG. 3 is a diagram for explaining a method of controlling the transit time of image segmentation in the present invention.

Referring to FIG. 3, the reference angle θL of the Virtual Device FOV determined by the equation below. The reference angle θL is the left end of the Virtual Device FOV. The angle is positive in the counterclockwise direction.

$$\theta L(k) \in [-(k+\tfrac{1}{2})\theta N+\Delta\theta\theta m, -(k-\tfrac{1}{2})\theta N+\theta g+\theta m]$$

N is the number of image segmentation, k is an integer from 0 to N−1, Δθ=θf−θg, θN=field of view of original image/N, θg is a Guard FOV, Of is a Virtual Device FOV, θm is an additional angle to locate object into the center of user's gaze.

An embodiment of the present invention determines that which image segmentation is the image segmentation belongs to the reference angle, by using the reference angle θL of the Virtual Device FOV determined by the above equation. And, if it is determined that the image segmentation belongs to reference angle has been changed, the reproduced image segmentation is transited.

A virtual reality image reproducing device configured to control transit time of reproduced image among a plurality of image segmentation reproduce image segmentation by using the above method. In a preferred embodiment, the virtual reality image reproducing device may include an image reproducer, a virtual FOV generator, and a reproducing image transit module.

The image reproducer reproduces image segmentation that expresses a part of the original image for implementing virtual reality. The virtual FOV generator generates a Virtual Device FOV that is wider than the Device FOV of the head-mounted display by a predetermined Additional FOV.

The reproducing image transit module determines a transition of reproduced image segmentation among a plurality of image segmentation when one end of the Virtual Device FOV reaches a specific point in the Guard FOV included in the Play FOV.

The Play FOV of the image segmentation is generated by adding a Guard FOV to a Temporary FOV covered by the temporary image segmentation that divides the original image into Nth regions, which is as described above.

[Frame Synchronization of Image Segmentation Before and after Transition]

A group of pictures (GOP) refers to a set including at least one I frame in MPEG image processing. Frames include I (Intra-coded), P (Predictive-coded), and B (Bidirectional-coded) frames. I frames are keyframes and are encoded without reference to other frames. Accordingly, the I frames can be independently decoded without reference to other frames.

P frames are coded with reference to the previous I frames and P frames. B frames are coded using both the previous and subsequent I frames and P frames. Accordingly, it takes a considerable amount of time to decode the B frames.

Therefore, when the frame of image segmentation reproduced after transition is frame B, the time required for decoding may greatly increase, which may lead to synchronization failure.

Accordingly, the present invention maintains the time required for decoding within a predictable range by transiting between image segmentation only in keyframes.

In this sense, a preferred embodiment of the present invention shortens the key frame distance (KFD) of image segmentation by using a predetermined method. And, when transiting the image segmentation that is reproduced as the user's gaze changes, frame synchronization between image segmentation before and after transition is implemented, by executing a transition of image segmentation only in key frame among frames composing image segmentation.

In one embodiment, the key frame distance may be shortened by a method of not including B frames in the image set. Since the time required for decoding the B frames is considerable.

On the other hand, in order to perform a transition only at a key frame rather than an immediate transition, a predetermined delay time must be secured. In other words, the transition should be delayed by a predetermined delay time, and there should be no problem that the screen reproduced during the delay time is cut off. To this end, the present invention secures the delay time by the method described below.

Figure 4:
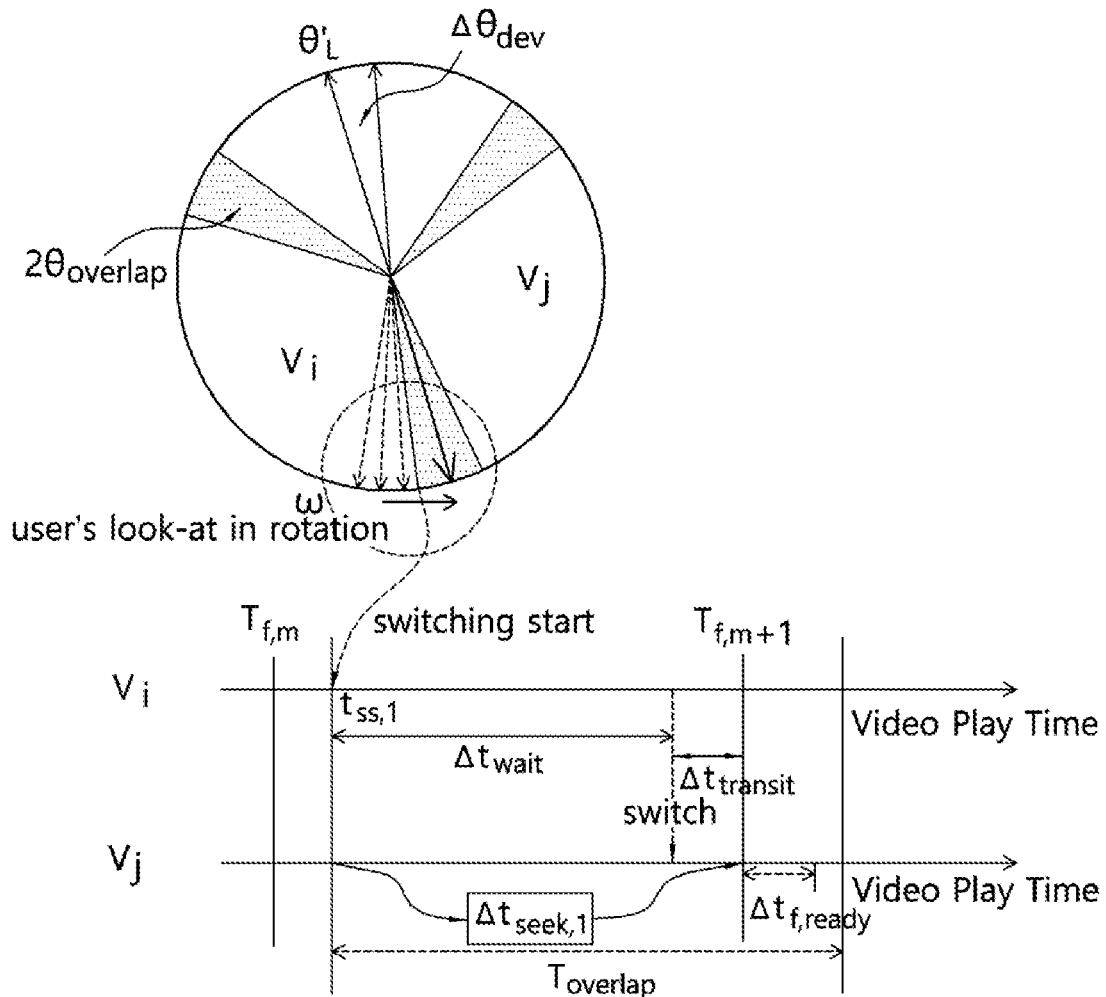
FIG. 4 is a diagram for explaining a method of synchronizing frames of image segmentation before and after conversion in the present invention.

FIG. 4 is a diagram for explaining a method of synchronizing frames of image segmentation before and after conversion in the present invention. FIG. 4 illustrates a case of transiting from image segmentation Vi to Vj as an example. Tf,m is a time of the mth keyframe, Tf,m+1 is a time of the m+1th keyframe. Δtseek is a search time, which is the time it takes to find the next keyframe. Δtwait is a waiting time, which is the time to continue reproducing image segmentation before transition after starting the transit procedure. As described above, since image segmentation overlaps as many as predetermined regions, the screen does not freeze even if the image segmentation continues to be reproduced before conversion to a certain extent.

Δt is the delay time, which is the sum of Δtwait and Δttransit. Δttransit is the transition time, which is the time required to transition the frame. For example, it may include the physical time to read a video file, decode frames, and prepare for display.

The delay time Δt is the time that must be secured to transit the image segmentation that is reproduced only in keyframes. The delay time is set to have the following range.

$$T\_GOP > \Delta t = \Delta t\text{wait} + \Delta t\text{transit} > \Delta t\text{seek}$$

In other words, the delay time should be greater than the time to find the next keyframe of image segmentation after playback. Since the transition should be prevented when the keyframe is not found. Also, the delay time should be smaller than T_GOP.

In addition, the delay time is set to satisfy the following range.

$$T\_overlap > \Delta t$$

T_overlap is the overlap time, and is the time secured through the Guard FOV and Virtual Device FOV. The delay time should be less than the overlap time. If the overlap time is less than the delay time, the video sync will be lost.

$$T\_overlap = T\_by\_guard\_FOV + T\_by\_virtual\_FOV$$

T_by_guard_FOV is a time secured by the Guard FOV, and T_by_virtual_FOV is a time secured by the Virtual Device FOV.

If T_overlap is expressed in terms of angle and head rotation speed, T_overlap expressed as follows.

$$T\_overlap = (2*\text{Ooverlap} + \Delta\theta\text{dev})/\text{head angular speed}$$

The head rotation speed cannot be preset. The maximum head rotation speed can be known in advance.

The stable delay time can be secured when a condition of "maximum head rotation speed (omega)<(2*theta_overlap+ dtheta_dev)/{Max(t_seek)+dt_transit)}" is satisfied. Usually, each setting can be obtained by statistically measuring the rotational speed of a normal person's head.

The virtual reality image reproducing device that implements frame synchronization by controlling the transit time among image segmentation expressing virtual reality of the present invention implements frame synchronization through the above method.

In a preferred embodiment, the virtual reality image reproducing device may include an image reproducer and an image segmentation synchronize module.

The image reproducer reproduces image segmentation that expresses a part of the original image for implementing virtual reality.

The image segmentation synchronize module controls the transit time of image segmentation to synchronize frames of image segmentation before and after transition when transiting reproduced image segmentation as the user's gaze changes.

The image segmentation synchronize module is characterized in that it implements frame synchronization between image segmentation before and after transition by allowing the transition of image segmentation to be executed only in the key frame of image segmentation.

The present invention has an effect of allowing the screen to be reproduced without screen freeze by controlling the transit time of image segmentation reproduced among a plurality of image segmentation.

In addition, the present invention has an effect of preventing a problem that the previously played image is replayed or a scene to be reproduced is skipped by synchronizing frames of image segmentation before transition and image segmentation after transition.

On the other hand, even if it is an effect not explicitly mentioned herein, it is added that the effects described in the following specification expected by the technical features of the present invention and their potential effects are treated as described in the specification of the present invention.

It is apparent to those skilled in the art that the present invention may be embodied in other specific forms without departing from the characteristics of the present invention. Accordingly, the above detailed description should not be construed as restrictive in all respects but as exemplary. The scope of the present invention should be determined by a reasonable interpretation of the appended claims, and all modifications within the equivalent scope of the present invention are included in the scope of the present invention.

What is claimed is:

1. A method of virtual reality image transition configured to implement frame synchronization by controlling transit time among image segmentation expressing virtual reality comprising:
   (a) determining a key frame distance(KFD) of image segmentation expressing a part of original image for implementing virtual reality; and
   (b) implementing frame synchronization between image segmentation before and after transition by executing a transition of image segmentation only in a key frame among frames composing image segmentation when reproduced image segmentation is transited as the user's gaze changes;
   wherein the step (a) further comprises, a step of determining a Play field of view(FOV) of image segmentation by adding a Guard FOV to a Temporary FOV covered by a temporary image segmentation, in the temporary image segmentation that divides the original image into Nth regions,
   wherein the step (b) starts transition procedure of image segmentation when the user's gaze reaches a specific point among the guard FOV of reproduced image segmentation and prevents the user's gaze located outside of the Play FOV of reproduced image segmentation before the transition of image segmentation is finished.

2. A method of virtual reality image transition configured to implement frame synchronization by controlling transit time among image segmentation expressing virtual reality comprising:
   (a) determining a key frame distance(KFD) of image segmentation expressing a part of original image for implementing virtual reality; and
   (b) implementing frame synchronization between image segmentation before and after transition by executing a transition of image segmentation only in a key frame among frames composing image segmentation when reproduced image segmentation is transited as the user's gaze changes;
   wherein the step (a) further comprises a step of determining a Virtual Device field of view(FOV) wider than a Device FOV of the head-mounted display by a predetermined Additional FOV,
   wherein the step (b) starts transition procedure of image segmentation when the user's gaze reaches a specific point among a guard FOV of reproduced image segmentation and prevents the user's gaze locating outside of a Play FOV of reproduced image segmentation before the transition of image segmentation is finished.

3. A method of virtual reality image transition configured to implement frame synchronization by controlling transit time among image segmentation expressing virtual reality comprising:
   (a) determining a key frame distance(KFD) of image segmentation expressing a part of original image for implementing virtual reality; and
   (b) implementing frame synchronization between image segmentation before and after transition by executing a transition of image segmentation only in a key frame among frames composing image segmentation when reproduced image segmentation is transited as the user's gaze changes;
   wherein the step (a) further comprises a step of determining a Play field of view(FOV) of the image segmentation by adding a Guard FOV to a Temporary FOV covered by the temporary image segmentation, in the temporary image segmentation that divides the original image into Nth regions; and a step of determining a Virtual Device FOV wider than a Device FOV of the head-mounted display by a predetermined Additional FOV,
   wherein the step (b) starts transition procedure of image segmentation when one end of the Virtual Device FOV reaches a specific point in the Guard FOV included in the Play FOV.

* * * * *